Sheet 1-2 Sheets

Rich & Neisler.
Cultivator & Harrow.
N° 73547  Patented Jan. 21, 1868.

Witnesses.  Inventors.

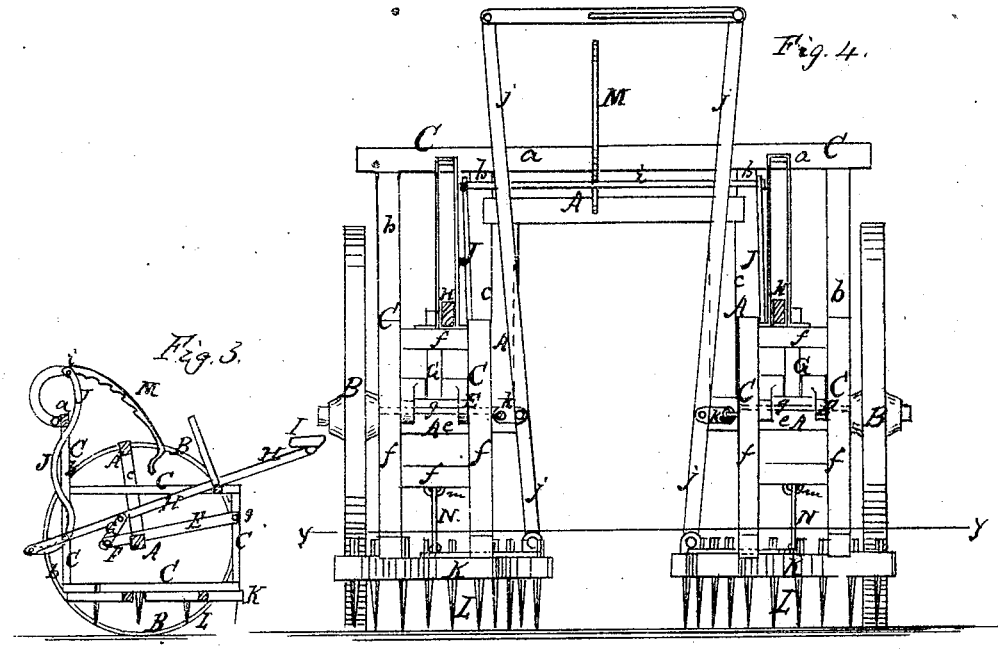
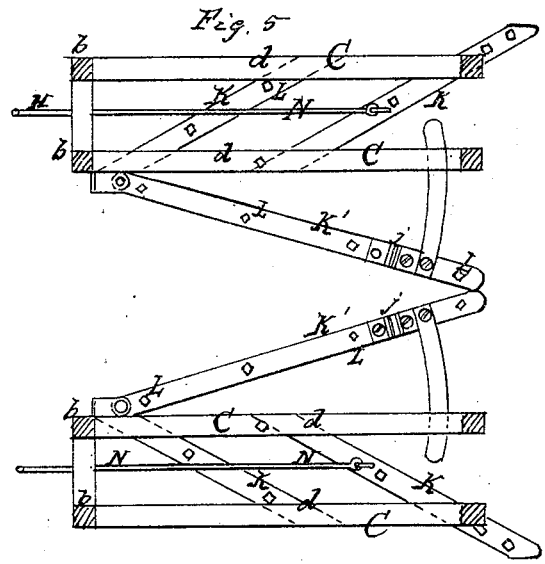

United States Patent Office.

CHARLES RICH AND OSCAR L. NEISLER, OF POUGHKEEPSIE, NEW YORK.

*Letters Patent No. 73,547, dated January 21, 1868.*

IMPROVEMENT IN COMBINED CULTIVATOR AND HARROW.

*The Schedule referred to in these Letters Patent and making part of the same.*

TO ALL WHOM IT MAY CONCERN:

Be it known that we, CHARLES RICH and OSCAR L. NEISLER, of Poughkeepsie, in the county of Dutchess, and State of New York, have invented a new and improved Corn-Cultivator and Harrow; and we do hereby declare that the following is a full, clear, and exact description thereof, which will enable others skilled in the art to make and use the same, reference being had to the accompanying drawings, forming part of this specification.

Figure 3 is a similar view on a smaller scale, showing the parts in different position.

Figure 4 is a rear elevation, partly in section, of the same.

Figure 5 is a horizontal section of the same, the plane of section being indicated by the line $y\ y$, fig. 4.

Similar letters of reference indicate corresponding parts.

This invention relates to a new agricultural machine, which can be used for cultivating corn, or for broadcast harrowing or tilling, and which is adapted to straddle a row of corn of a height of more than five feet.

This invention consists, first, in arranging two cultivator-frames on a suitable truck, and in having the same so connected by means of suitable levers that they can be separated so as to work on both sides of a hill, or that they can be connected so as to form one complete set of harrows or cultivator-teeth for broadcast harrowing or tilling.

This invention consists, second, in so connecting the aforesaid frames with the axle of the truck and with the driver's seat by means of various levers, links, &c., that their height can be easily adjusted by the driver, and that their weight is balanced by that of the driver on the seat. The driver is thereby enabled to instantly throw the teeth out of ground by putting his whole weight upon the seat. This is of great importance, as frequently stones or stumps require a sudden elevation of the teeth.

The invention consists, third, in connecting the draught-bars, to which the horses are hitched, to the rear of the harrow-frame, and in the use of two guide-poles to keep the horses from the centre, thereby protecting the row of corn which is being cultivated. By attaching the draught-bars to the rear of the harrow-frames, leverage is gained, and the work is facilitated for the horses.

The invention finally consists in the use of hollow-cast cultivator-teeth, having pyramidal holes, so that they can be slipped upon the harrow-teeth and fastened thereto by means of suitable set-screws, or other devices. The complete removal of the harrow-teeth, from the frame, to make room for the cultivator-teeth, is thus avoided, and the harrow-teeth can, therefore, be more firmly and securely fitted in their frames.

Figure 1:
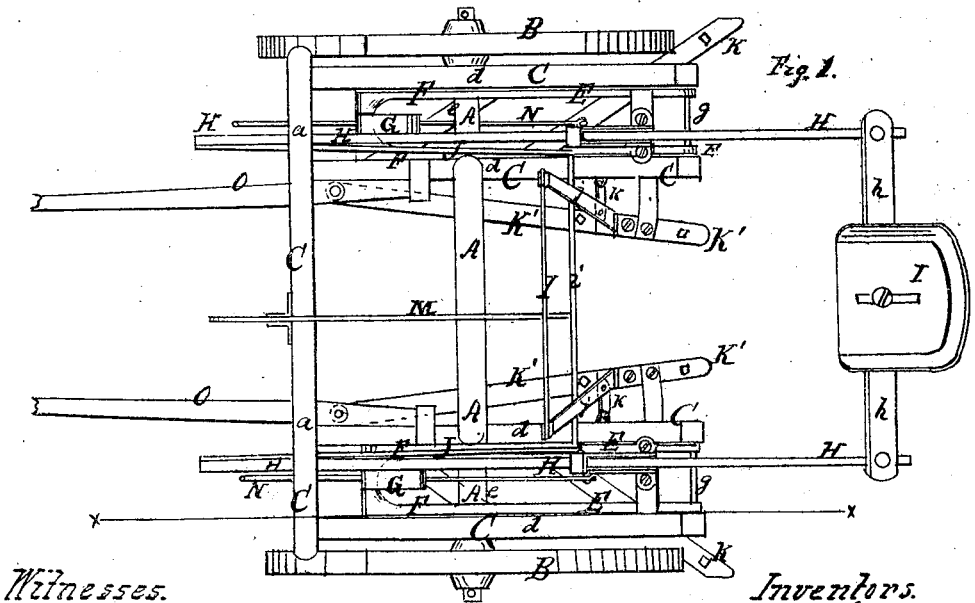
Figure 1 represents a plan or top view of our invention.

A represents the axle of our improved cultivator. The same is made of wood or metal, and of a shape similar to an inverted letter U, as seen in fig. 1, for the purpose of enabling it to clear a row of corn of suitable height. Upon the ends of its horizontal arms are hung wheels, B B, of suitable construction and dimensions. C is the main harrow-frame. The same consists of a horizontal bar, $a$, which is arranged parallel with and in front of the axle A, and to the under side of which four vertical bars, $b\ b$, are secured. Two of these vertical bars $b$ are arranged near each end of the bar $a$. The two centre bars are further apart from each other than the upright arms $c$ of the axle A, while the two bars $b$, near each end, are closer together than the upright arms $c$ and wheels $b$, so that the horizontal bars $d$, which project from the bars $b$ towards the rear, will fit between the wheels and the arms $c$ of the axle. Two pairs of such bars, $d$, are attached to each pair of bars $b$, one pair above and one below each end arm, $e$, of the axle. The rear ends of the bars $d$, on each side of the machine, are connected with each other by suitable horizontal and vertical connections, $f\ f$. This frame C is pivoted indirectly to the axle A by horizontal pins $g\ g$, which are fitted through the rear vertical bars, $f$, of the frame, and through horizontal bars or cranks, E, which project from the rear of the axle. From the front of the axle project also bars or cranks, F, to which are pivoted the ends of short bars or links, G, the upper ends of which links are pivoted to long levers H H. The rear ends of the two levers H are longer than their front ends, beyond the connection with the links G, and their rear ends are connected by a cross-bar, $h$, upon which a longitudinally adjustable driver's seat, I, is secured. The front end of each lever, H, is pivoted to the lower end of a lever, J, each lever J being, near its lower end, pivoted to a bar, $b$, of the frame C, while the upper end of the levers J are connected by a cross-bar, $i$, as shown. K K are horizontal bars, secured to the under side of the lower bars $d\ d$ of the frame C, in any suitable manner. To the bars K are secured the harrow-teeth L in a substantial manner. M is a notched bar, hinged to the bar $a'$ of the frame C, and arranged so that it can be thrown over the bar $i$, if desired. When the bar $i$ is not connected with the bar M, the parts are in position shown in fig. 2. When the driver is upon the seat I, with his feet upon the rear ends of the bars $d$, he balances the whole frame C. By removing his feet from the frame C, his weight will depress the rear ends of the levers H, thereby raising their front ends, and with the same the frame C, which is mainly connected with their front ends. By the use of the bar M the depth of the teeth in the ground can be gauged at will, or, if desired, the teeth can be thrown out of ground entirely, as shown in fig. 3.

It will be seen that by means of the U-shaped axle, and by fitting the frame C around each side of the raised part of the axle, the harrow-frames K are divided into two sections, which are arranged on the sides of the machine. To the front part of each frame, K, at the inner side of the same, is pivoted a bar, K', which is, at its rear end, pivoted to a vertical bar, $j$, as shown. The bars $j$ are pivoted to lugs, $k\ k$, projecting from the inner sides of the bars $d$, and project above the said lugs, where they are connected by a slotted or perforated cross-bar, $l$, (see fig. 4.) The bars K' are provided with harrow-teeth, L, as shown, and can, by the manner in which they are arranged, be placed at any desired distance apart to fit any sized hill, (see fig. 1,) and they can, by means of the handle $l$, be managed so as to accommodate their rear ends to the irregularity of the hills. By adjusting the upper ends of the bars $j$ on the bar $l$, the distance between the rear ends of the bars K' is regulated.

Figure 2:
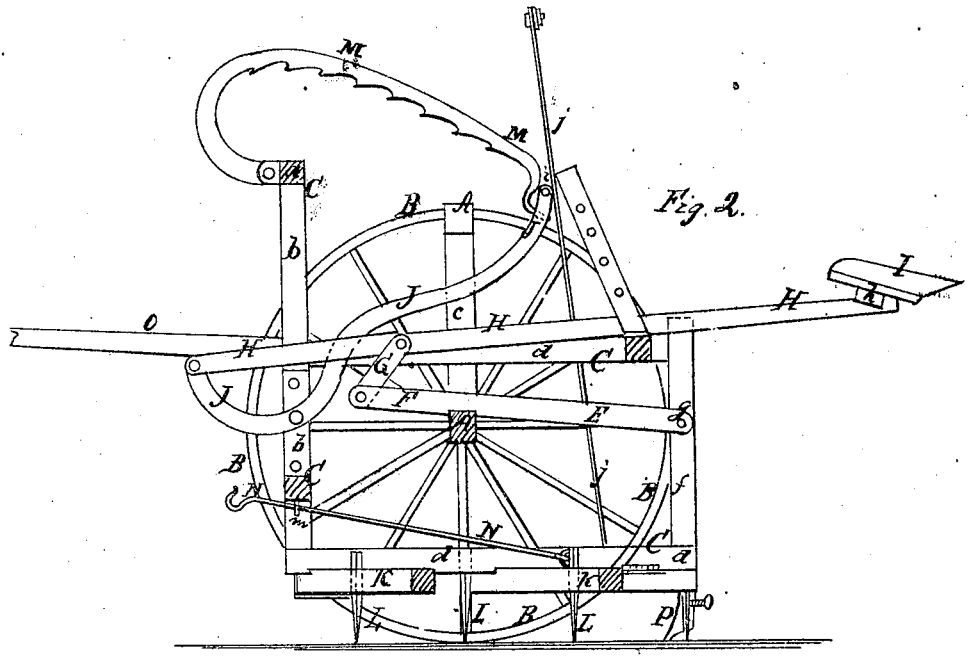
Figure 2 is a vertical longitudinal section of the same, the plane of section being indicated by the line $x\ x$, fig. 1.

For broadcast-harrowing or tilling, the rear ends of the bars K' can be brought close together, as in fig. 1, when a complete set of harrow-teeth will be formed between the wheels of the apparatus. N N are the draught-bars. The same are arranged, one on each side of the frame C, and are secured to the rear part of each frame, K, and guided in staples, $m$, formed on the front portion of the frame C, as shown in fig. 2. O O are two poles, secured to the inner arms, $b$, of the frame C, or otherwise to the frame C, so as to prevent the horses from stepping on the corn on the hill, the horses being hitched to hooks formed on the front ends of the bars N. P is a cultivator-tooth, as the same is to be used in connection with this machine. The said tooth is cast hollow, so as to be fitted over a harrow-tooth, L, and is then secured to the same by means of a set-screw or other suitable device. The tooth P can be slipped on or off the harrow-tooth with facility, and the harrow-teeth can therefore always remain on their frames. Thereby the machine can be easily converted into a cultivator, and from the latter again into a harrow, as may be desired.

We claim as new, and desire to secure by Letters Patent—

1. The adjustable bars K' K', when arranged on the sides of the hill, and when provided with handles $j\ j$, connected at their upper ends so that the teeth can be accommodated to irregularities in the hill, or can be connected for broadcast-harrowing or tilling, substantially as herein shown and described.

2. The device for connecting the harrow-frame C with the axle A and driver's seat I, consisting of the bars E and F on the axle, of the links G, levers H and J, and connecting-rods $h$ and $i$, all made and operating substantially as and for the purpose herein shown and described.

3. The above, in combination with the notched bar M, when made as and for the purpose described.

4. Securing the draught-bars N to the rear of the harrow-holders K, substantially as and for the purpose herein shown and described.

5. The hollow cultivator-tooth P, when arranged so that it can be fitted to and easily removed from a harrow-tooth, L, substantially as and for the purpose herein shown and described.

CHARLES RICH,
OSCAR L. NEISLER.

Witnesses:
WILLIAM GRAHAM,
S. H. MILLER.